UNITED STATES PATENT OFFICE.

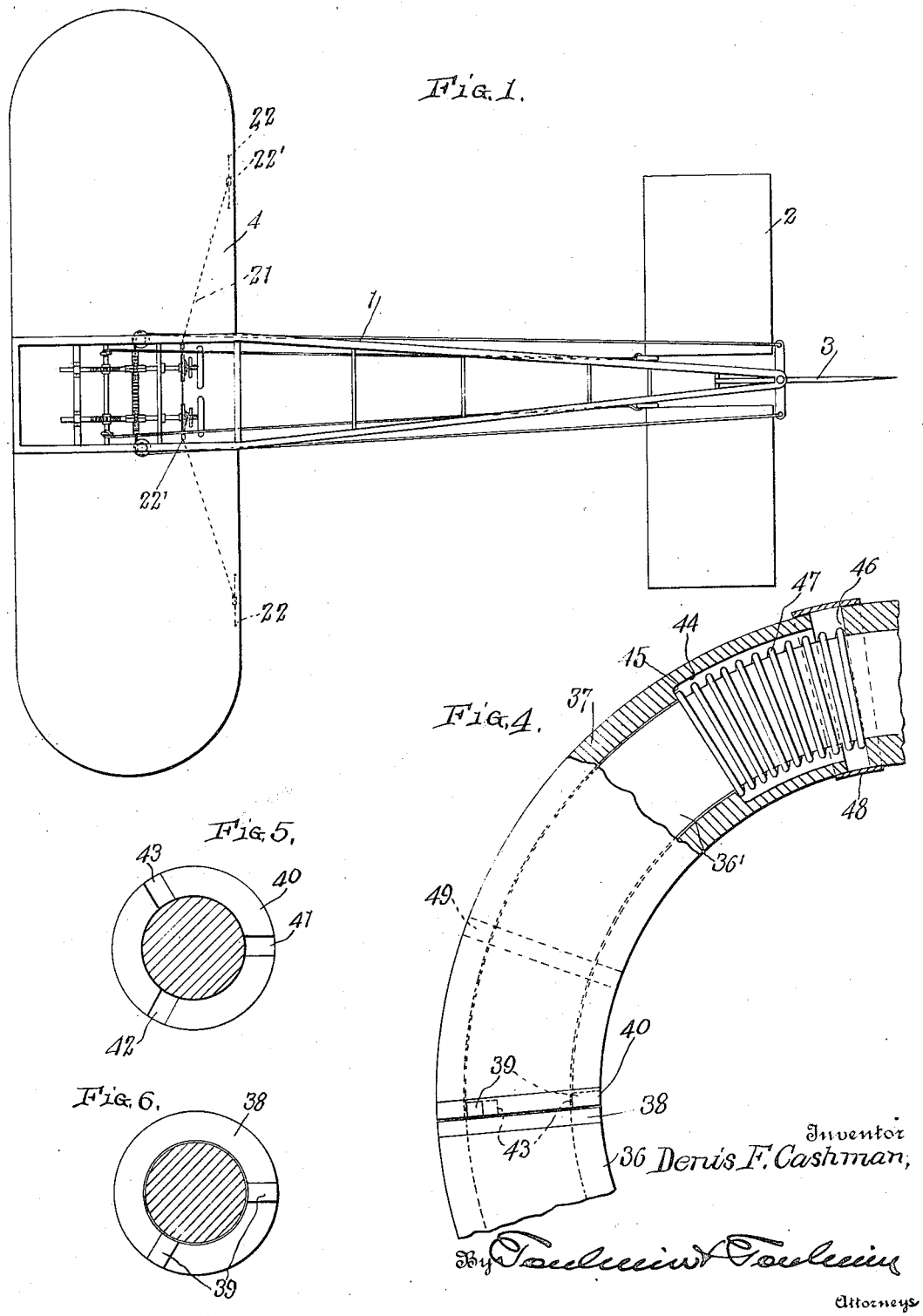

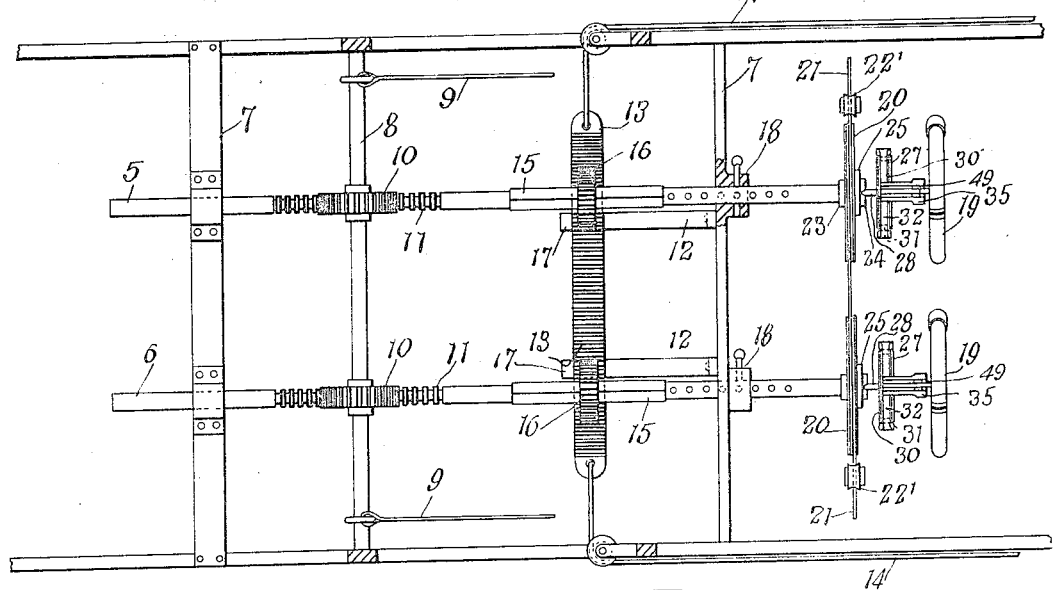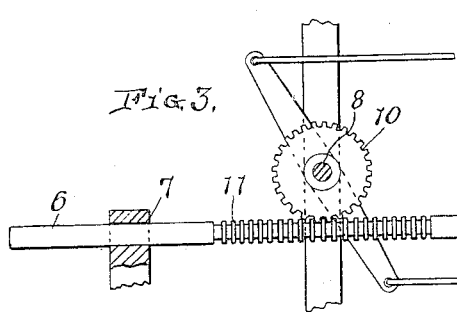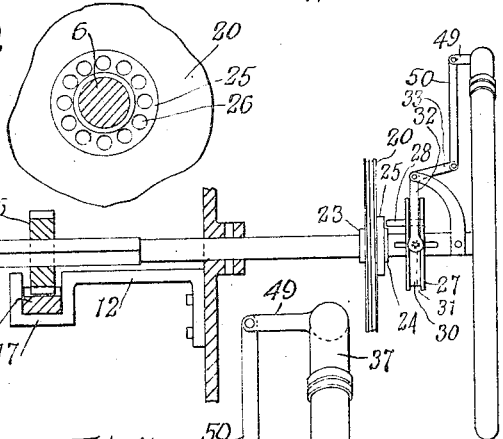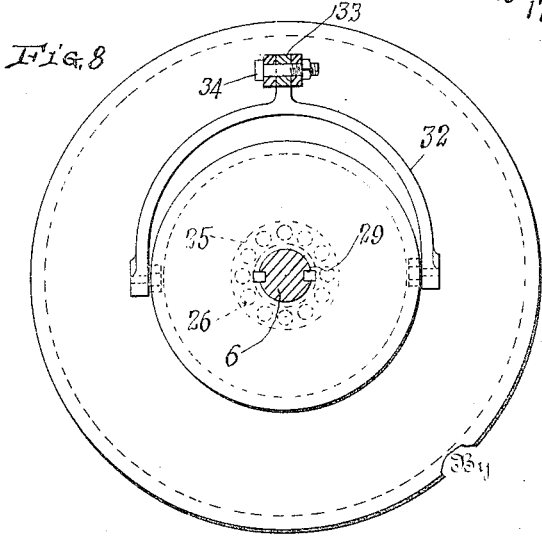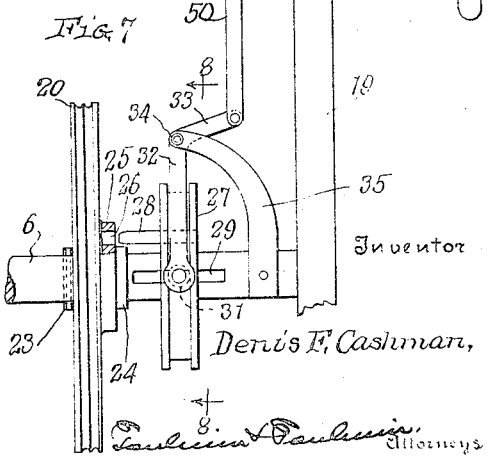

DENIS F. CASHMAN, OF DAYTON, OHIO.

CONTROL FOR AERIAL VEHICLES.

1,210,418.

Specification of Letters Patent.

Patented Jan. 2, 1917.

Application filed April 24, 1916. Serial No. 93,068.

*To all whom it may concern:*

Be it known that I, DENIS F. CASHMAN, a subject of the King of Great Britain, residing at Dayton, in the county of Montgomery and State of Ohio, have invented certain new and useful Improvements in Controls for Aerial Vehicles, of which the following is a specification, reference being had therein to the accompanying drawing.

This invention relates to controls for aerial vehicles, such as aeroplanes, flying machines and dirigible balloons and is in the nature of an improvement on the invention, of which an embodiment is shown and described in a patent granted to me March 28th, 1916, No. 1,177,382.

The object of the present invention is to provide a control for aerial vehicles by which the several balancing and steering elements may be operated singly or simultaneously; and to provide means for locking certain of the elements in operative relation to the control.

In the accompanying drawings, Figure 1 is a plan view showing the application of my invention to an aeroplane, one form of an aerial vehicle; Fig. 2 is a plan view of the dual control showing the locking device and with parts of the frame in section; Fig. 3 is an elevation of the control, partly in section; Fig. 4 is a detail showing the portion of the steering wheel by which the locking device is operated; Figs. 5 and 6 are detail sections showing the locking means for the control for the locking device; Fig. 7 is an enlarged detail view of the locking device, as shown in Fig. 3; Fig. 8 is a section on the line 8—8 of Fig. 7, looking in the direction of the arrows; and Fig. 9 is a detail section showing a further portion of the locking device.

In the embodiment of the invention here shown I have illustrated in Fig. 1 a typical form of aeroplane provided with a fuselage 1, a horizontal rudder 2, a vertical rudder 3 and planes 4. In the machine here illustrated the planes are of the warping kind. The control for operating the several elements, as shown in Figs. 2 and 3, comprises a pair of shafts or controlling elements 5 and 6 rotatably and slidably mounted within suitable transverse portions 7 of the fuselage. Journaled within the frame work or fuselage is a transversely extending shaft 8 to which are attached the controlling cables 9 for operating the horizontal rudder 2. The shaft 8 is provided with a pair of spaced apart gears 10 fixed thereto. The shafts 5 and 6 are located below the gears 10 and the portions thereof beneath the gears are provided with round rack sections 11 in engagement therewith. I have also provided a pair of brackets 12 adapted to support a transversely extending and slidable rack 13 connected by cables 14 to the vertical rudder 3. The rack is situated below the shafts 5 and 6 and the portions of these shafts adjacent the same are square, as shown at 15. Slidably mounted upon these square portions are gears 16 in mesh with the rack 13, rotatable with the shafts but allowing the longitudinal movement thereof. The gears are held in mesh with the rack 13 through the instrumentality of forks 17 upon the brackets 12. I have also provided for each shaft a locking member 18. A steering wheel 19 is provided at the end of each shaft for operating the same. The structure described above is fully shown and described in the patent above mentioned and a further detail description of the same is therefore not necessary, as reference can be made to the said patent and it is thought that the description for the purposes of the present invention is sufficiently clear.

The shafts 5 and 6 are each provided with a pulley 20 rotatably mounted thereon but held against axial movement relatively thereto. The planes are warped by means of a cable 21 attached at its ends, as indicated at 22, to the same and having its intermediate portion wound, substantially as shown, around the pulleys 20 which can be locked to their shafts as desired. The cable 21 is suitably guided around pulleys 22' and is so wound around the pulleys 20 that the control for the warping is a natural one, the wheels being turned toward the high side to balance. The pulleys 20 are held against axial movement along their shafts by collars 23 and 24. Although the pulleys 20 must move with their shafts when the same are moved longitudinally, yet the controlling cable 21 is so arranged with reference thereto that the movement does not affect the warping. Each pulley 20 is provided with an enlarged hub portion 25 provided with a plurality of circumferentially arranged spaced apart holes 26 therein, the hub and holes constituting one member of a clutch or locking device. The other member 27 of the clutch or locking device is provided with a tapered finger 28 fixed thereto and projecting toward the hub portion 25 and the holes therein. Each shaft 5 and 6 is keyed to its clutch member 27, as shown at 29, so that the clutch member can move longitudinally of the shaft and rotate therewith. The clutch member 27 is provided with a circumferential groove 30 therein adapted to receive the roller ends 31 of a fork 32. This fork constitutes one arm of a bell crank lever 33 pivoted at 34 to an upwardly extending bracket 35 fixed to the shaft. As the clutch member is moved axially toward the pulley 20 it will be seen that the finger 28 will engage one of the holes 26, locking the pulley so that it will rotate when the wheel 19 is rotated. For moving the bell crank lever to lock and unlock the clutch members I have provided a suitable operating device mounted upon the steering wheel, the location thereof being convenient and readily accessible to the pilot. A portion of the outer shell 36 of the steering wheel has been cut away, exposing a part of the ring or core 36' thereof. Around this exposed portion 36' is the operating device or sleeve 37 which is loosely mounted thereon and capable of both rotation therearound and movement lengthwise thereof. The sleeve 37 simulates the general outline of the wheel and presents a very smooth and uniform appearance. The end of the outer shell 36 adjacent the cut-away portion is provided with a reinforcing ring 38 provided with projecting spaced apart lugs 39 thereon, as shown in Fig. 6. The adjacent end of the member 37 is also provided with a reinforcing ring 40, (see Fig. 5), provided with spaced-apart recesses 41, 42 and 43 therein adapted to co-act with the lugs 39 to hold the member 37 in position to lock the pulley 20 to its shaft or keep the same unlocked. A portion of the controlling device 37 adjacent the opposite end thereof is cut away, as shown at 44, to form a shoulder or abutment 45. The shoulder or abutment 45 coöperates with the adjacent end 46 of the outer shell 36 to form abutments between which is located a coiled spring 47 encircling the core 36'. The spring normally keeps the reinforcing rings 38 and 40 in engagement with each other with the lugs coöperating with the recesses to hold the member 37 in locked position. The end 46 is provided with a ferrule 48 which extends across the adjacent portions of the member 37, which slidably engages the same, whereby the spring is protected and no gaps are normally presented in the wheel.

Fixed to the member 37 is a forwardly extending arm 49. The end of the arm and the bell crank lever 33 are connected by a link 50. The connection between the bell crank lever and the arm is more or less flexible to allow the movement of the operating device 37 either to engage or disengage the lugs 39.

It is true that I have shown the pulleys 20 as connected up with the warping devices, while the rack 13 is connected to the vertical rudder and the shaft 8 connected with the horizontal rudder, but it is to be understood that this showing is made for illustration only and the several controlling devices of this control can be connected to any of the balancing or steering elements of the aerial vehicle as is convenient.

The general arrangement set forth above is a very durable one. The steering and balancing elements are easily and quickly operated and the control is compact and does not require unusual attention on the part of the pilot. In the embodiment of the invention here shown when it is desired to operate one steering or balancing element the shaft 5 or 6 is moved axially or longitudinally. When it is desired to control another element the shaft is rotated. If a third element is to be controlled, one of the pulleys 20 is connected to its shaft by means of the locking device and this is done by first disengaging the recesses 41 and 42 of the member 37 from the lugs 39, this movement being accomplished against the tension of the spring 47. A slight rotation is then imparted to the member, which rotation causes the forked end of the bell crank lever 33 to swing toward the left in Fig. 7, causing the engagement of the pin 28 with the opening 26. When the member 37 is again released the lugs 39 will be engaged by the recesses 42 and 43, locking the member 37 and thereby securely retaining the pulley 20 locked to the shaft upon which it is mounted. The steering wheel can then be rotated as a whole and this will cause the simultaneous operation of two of the balancing or steering elements. In the particular instance here shown the warping and vertical rudder are simultaneously controlled, yet it is to be understood that any of the controlling, balancing or steering elements may be connected up to the devices here shown.

It will further be seen that the shaft 8 and the rack 13 may be simultaneously operated by simultaneously imparting to the shafts 5 or 6 both a longitudinal and rotary movement and provided that the pulley 20 is locked to its shaft it will also be seen that simultaneous movement may be imparted to all three of the elements, 8, 13 and 20.

Another interesting feature of my invention is the dual control as modified by the application of the pulleys 20 and the locking devices therefor. For instance, if the shaft 5 is rotated it will be seen that the shaft 6 will be rotated in the same direction through the rack 13 and if the pulley 20 on the shaft 6 is locked thereto it will cause the operation of the warping elements even if the pulley on the shaft 5 is not locked. The dual control, however, is not essential to the success of the invention as the latter is applicable to single controls.

While I have shown and described one embodiment of my invention it will be understood that the same has been chosen for the purposes of illustration, and that I do not desire to be limited to the details of construction shown and described, for obvious modifications will occur to a person skilled in the art.

Having thus fully described my invention, what I claim as new and desire to secure by Letters Patent, is:—

1. In a control for aerial vehicles, a rotatable and axially movable controlling shaft, a plurality of devices for controlling the various steering and balancing elements actuated by the several movements of the shaft, and means for locking and unlocking certain of said devices to and from the shaft.

2. In a control for aerial vehicles, a rotatable and axially movable controlling shaft, a plurality of devices for controlling the various steering and balancing elements, certain of said devices being controlled by movement of said controlling shaft in one direction, and a plurality of said devices being controlled by the movement of said controlling shaft in a different direction, and means for locking and unlocking certain of said last-mentioned devices to and from the controlling shaft.

3. In a control for aerial vehicles, a pair of controlling shafts, a gear mounted on each shaft, a rack in engagement with said gears and adapted to be actuated by either of them, a pulley rotatably mounted upon each shaft, and locking means associated with each pulley to lock and unlock the same to and from its shaft, said rack and said pulleys being adapted to be connected to the various balancing and steering devices of the vehicle.

4. In a control for aerial vehicles, a controlling element provided with a hand wheel, a device for controlling the balancing or steering element of the vehicle, means for locking and unlocking said device to and from the controlling element, and a movable sleeve upon said wheel for actuating the locking means.

5. In a control for aerial vehicles, a rotatable shaft, a plurality of devices rotatable with said shaft and connected with the balancing and steering elements of the vehicle, means for locking and unlocking one of said devices to and from the shaft, and means for positively actuating by hand the locking and unlocking means.

6. In a control for aerial vehicles, a controlling shaft rotatably mounted, a plurality of devices for controlling the various steering and balancing elements of the vehicle, means for locking and unlocking one of said devices to and from said shaft, said locking means comprising a locking member slidably mounted on said shaft, a bracket fixed to said shaft, a bell crank lever having one arm in operative engagement with said locking member, and means attached to the remaining arm of said bell crank lever for controlling the same.

7. In a control for aerial vehicles, a rotatable shaft provided with a steering handle and with a device adapted to be connected to one of the balancing and steering elements of the vehicle, means for locking and unlocking said device to and from said shaft, and means comprising a movable sleeve upon said handle for positively actuating by hand the locking and unlocking means.

8. In a control for aerial vehicles, a controlling shaft provided with a wheel and a device adapted to be connected to one of the balancing and steering elements of a vehicle, a clutch for locking and unlocking said device to and from the shaft, a bell crank lever mounted upon said shaft for actuating said clutch, a sleeve mounted upon said wheel and connected to said bell crank lever for actuating the clutch, said sleeve being capable of a plurality of movements upon said wheel, and locking means controlled by one movement of said sleeve, the other movement of said sleeve controlling the clutch.

9. In a control for aerial vehicles, a controlling element, a device adapted to control one of the steering and balancing elements of the vehicle and means for locking and unlocking said device to and from said controlling element, said means comprising a member movable in a plurality of directions and means to lock and unlock said member, said member being movable in one direction to unlock the same and movable in another direction to lock the controlling device.

10. In a control for aerial vehicles, a controlling shaft provided with a hand wheel, a pulley rotatably mounted upon said shaft but held against axial movement relatively thereto, and means for locking and unlocking said pulley to and from said shaft, said locking means comprising a device slidably mounted upon said shaft but held against rotary movement relatively thereto, and a controlling member operatively connected to said slidable device, said member being mounted upon said wheel and rotatable thereon to operate the slidable device and movable lengthwise thereof, whereby it is locked to and unlocked from said wheel.

11. In a control for aerial vehicles, a plurality of controlling elements, a plurality of devices common to said controlling elements for controlling the various steering and balancing elements and locking means associated with each controlling element to lock or unlock one of said devices to or from a controlling element.

12. In a control for the various balancing and steering elements of an aerial vehicle, a rack adapted to be connected to one of said elements, a pinion meshing with said rack, a rotatable shaft connected to a second of said elements, a pinion fixed to said shaft, a rotatable and axially movable controlling shaft, said first-mentioned pinion being rotatable with said shaft, said shaft being operatively connected to said last-mentioned pinion to operate the same when moved axially, and means on said shaft for operating a third of said elements.

In testimony whereof, I affix my signature.

DENIS F. CASHMAN.